United States Patent [19]

Haspra et al.

[11] Patent Number: 4,777,266

[45] Date of Patent: Oct. 11, 1988

[54] PROCESS FOR THE PREPARATION OF ANTHRAQUINOID DISPERSE DYES AND MIXTURES THEREOF

[75] Inventors: Pavel Haspra, Rheinfelden; Alex Nicopoulos, Basel, both of Switzerland

[73] Assignee: Ciba-Geigy Corporation, Ardsley, N.Y.

[21] Appl. No.: 888,909

[22] Filed: Jul. 22, 1986

[30] Foreign Application Priority Data

Jul. 24, 1985 [CH] Switzerland ............... 3223/85

[51] Int. Cl.$^4$ ........................... C07D 209/56
[52] U.S. Cl. ........................... 548/426
[58] Field of Search ........... 548/426, 480, 450, 451; 564/470

[56] References Cited

U.S. PATENT DOCUMENTS

| 2,753,356 | 7/1956 | Laucius et al. | 548/426 |
| 3,450,760 | 6/1969 | Hoffman et al. | 564/470 |
| 3,835,154 | 9/1974 | Putzig | 548/426 |
| 4,491,666 | 1/1985 | Niess et al. | 548/426 |
| 4,550,178 | 10/1985 | Karlen et al. | 548/426 |

FOREIGN PATENT DOCUMENTS

| 0061039 | 10/1984 | European Pat. Off. | |
| 4052018 | 4/1979 | Japan | 564/470 |
| 5066956 | 5/1980 | Japan | 548/426 |

Primary Examiner—Mary E. Ceperley
Attorney, Agent, or Firm—Edward McC. Roberts; Meredith C. Findlay

[57] ABSTRACT

A process for the preparation of dyes of formula (1) as indicated in claim 1 or of mixtures of such dyes is described.

The dyes of formula (1) are obtained by reacting 1,4-diaminoanthraquinone-2,3-dicarboximide, or the corresponding monoimino compound, with an amine and in the absence of a solvent. Dye mixtures are prepared by subsequently partially transamidating the resultant product.

11 Claims, No Drawings

PROCESS FOR THE PREPARATION OF ANTHRAQUINOID DISPERSE DYES AND MIXTURES THEREOF

The present invention relates to a process for the preparation of 1,4-diamino-2,3-dicarboximide dyes which are substituted at the imide nitrogen atom, and of corresponding imino compounds. The invention further relates to a process for the preparation of mixtures of said dyes.

1,4-Diaminoanthraquinone-2,3-dicarboximides which are substituted at the imide nitrogen atom by alkoxyalkyl groups are disclosed e.g. in U.S. Pat. No. 2,753,356. They are obtained by reacting 1,4-diaminoanthraquinone-2,3-dicarboximide with alkoxyalkylamines in an organic solvent. European patent application No. EP-A-119 465 teaches that a specific mixture of two of these dyes has a better stability of the dispersion than the individual dyes, said mixture being especially suitable for dyeing and printing hydrophobic fibre materials, in particular polyester textiles. These mixtures can be obtained for example by reacting 1,4-diaminoanthraquinone-2,3-dicarboximide with a mixture of the appropriate amines in a solvent. European patent application No. EP-A-61039 describes the reaction of 1,4-diaminoanthraquinone-2,3-dicarboximide with amines in water.

It has now been found that the above mentioned dyes and, in particular, mixtures of said dyes, can be conveniently obtained by reacting the imides with the amines in the absence of water or a solvent.

Accordingly, the present invention relates to a process for the preparation of dyes of formula.

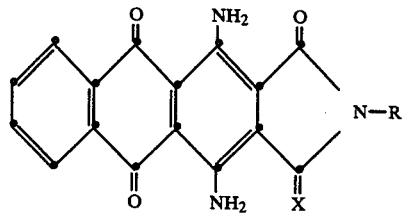
(1)

wherein
X is O or NH and
R is alkyl, alkylene-O-alkyl, alkylene-O-alkylene-O-alkyl or alkylene-O-akylene-O-phenyl,
which process comprises reacting a compound of formula

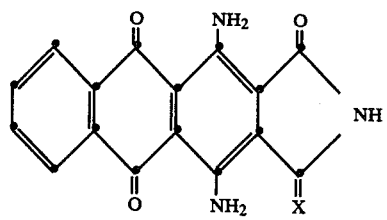
(2)

with an amine of formula R—NH₂, wherein X and R are as defined above, in the absence of a solvent.

Alkyl groups shall be understood as meaning unbranched, branched or cyclic alkyl groups, preferably those containing 1 to 10, most preferably 1 to 4, carbon atoms. Examples of suitable alkyl groups are: methyl, ethyl, n-propyl, isopropyl, n-butyl, sec-butyl or tert-butyl, n-pentyl, cyclohexyl or n-octyl.

The alkylene groups may also be unbranched or branched. Preferably they contain 2 to 4 carbon atoms and are in particular the ethylene or 1,3-propylene group.

The process of this invention is preferably employed for preparing dyes of formula (1), wherein X is O.

In the above reaction it is convenient to use an excess of amine, which can then also act as diluent. The amine can be used, for example, in a 3- to 20-fold molar excess, preferably in a 4- to 10-fold molar excess, based on the imide.

The reaction temperature may vary within wide limits. It may be in the range from about 0° C. to the boiling temperature of the amine, for example from 20° to 100° C. The preferred temperature range is from 20° to 80° C., e.g. from 30° to 60° C.

The compound of formula (1) can be employed in the subsequently described second step without being isolated. Preferably, however, it is isolated. The compound of formula (1) is sparingly soluble in the respective amine and can therefore be readily isolated by filtration. If it is not isolated in this manner, the excess amine can be removed at least partially by distillation and the residue employed direct in the second step.

The present invention relates further to a process for the preparation of mixtures containing at least two dyes of formula

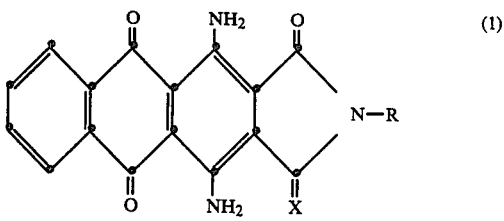
(1)

wherein
X is O or NH and
R is alkyl, alkylene-O-alkyl, alkylene-O-alkylene-O-alkyl or alkylene-O-alkylene-O-phenyl,
which process comprises reacting a compound of formula

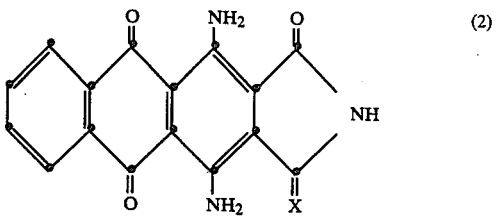
(2)

with an amine of formula R—NH₂, wherein X and R are as defined above, and subsequently partially transamidating the resultant dye of formula (1) by reaction with an amine of formula R'—NH₂, wherein R' may have the meaning of R but is different from R.

The first step of this process. i.e. the reaction of the imide of formula (2) with the amino, is preferably carried out as described above in the absence of a solvent.

The partial transamidation (second step) is preferably carried out in the presence of an inert solvent or diluent. However, it may also be carried out without a solvent or diluent and only in the presence of an excess of the amine required for the transamidation.

Examples of suitable solvents or diluents are: water-insoluble organic solvents such as aliphatic or aromatic hydrocarbons or aliphatic or aromatic halogenated hydrocarbons, for example benzene, chlorobenzene, dichlorobenzene or trichlorobenzene, 1,1,1-trichloroethane and the like; water-soluble organic solvents such as monohydric or polyhydric alcohols, e.g. methanol, ethanol, propanol, butanol, glycol and the like, preferably n-butanol; and water.

It is preferred to carry out the second step in an aliphatic alcohol, water, or in a mixture thereof. n-Butanol is especially preferred, but water is most preferred.

The second step is conveniently carried out at elevated temperature, for example in the range from 50° to 150° C., preferably from 70° to 140° C. It is especially preferred to carry out the second step in water at a temperature above 100° C., under pressure.

In the second step, the amine employed for the partial transamidation can be added in the amount theoretically calculated for obtaining the desired mixture ratio. However, in the second step too it is preferred to add an excess of amine, even if an additional solvent or diluent is employed. The use of an additional solvent or diluent is especially preferred. Thus, for example, the amine employed for the partial transamidation is added in the 2- to 10-fold, preferably 3- to 5-fold, molar amount, based on the theoretical requirement for obtaining the desired mixture ratio. The mixture ratio in the desired final product can then be adjusted by parameters which can be readily varied. Such parameters are: reaction temperature, reaction time and the amount of solvent or diluent. The amount of component formed in the second step by the transamidation increases proportionally to the rise in reaction temperature and/or reaction time. The amount of solvent or diluent also has an influence on the transamidation equilibrium and, naturally, the amount of amine employed as well. The mixture ratio of the components obtained can be easily determined in the course of the reaction by suitable analytical methods. In this manner it is possible to ascertain empirically the optimum parameters for every desired mixture ratio.

The entire process is preferably carried out as a batch process. However, it may also be carried out continuously using appropriate apparatus.

The process of this invention is particularly suitable for preparing a dye mixture comprising 1 part of the compound of formula

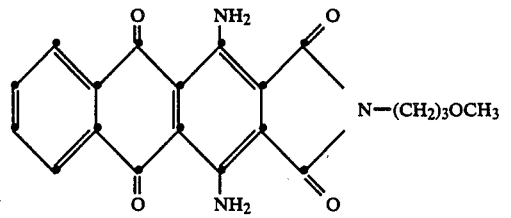

and 0.1 to 5 parts of the compound of formula

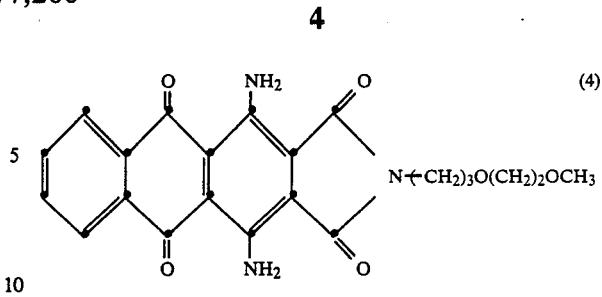

from 1,4-diaminoanthraquinone-2,3-dicarboximide, 3-methoxypropylamine and 3-(2-methoxyethoxy)-propylamine. This preferred embodiment comprises reacting 1,4-diaminoanthraquinone-2,3-dicarboximide, in the absence of a solvent, with 3-methoxypropylamine or 3-(2-methoxyethoxy)propylamine to give N-(3-methoxypropyl)-1,4-diaminoanthraquinone-2,3-dicarboximide or N-[3-(2-methoxyethoxy)propyl]-diaminoanthraquinone-2,3-dicarboximide, and partially transamidating the resultant N-substituted imide with 3-(2-methoxyethoxy)propylamine or 3-methoxypropylamine to give the desired mixture.

Thus 1,4-diaminoanthraquinone-2,3-dicarboximide can be reacted in a first step either with 3-methoxypropylamine or with 3-(2-methoxyethoxy)propylamine to give either a compound of formula (3) or (4), which is then partially transamidated in the second step with the other amine. Similar results are obtained in both variants. However, it is preferred to react the imide in the first step with 3-methoxypropylamine to give the compound of formula (3), and then to effect partial transamidation of said compound of formula (3) with 3-(2-methoxyethoxy)propylamine to give the desired mixture.

As is evident from European patent application No. EP-A-119 465, mixtures of dyes (3) and (4) have especially good properties (e.g. stability of the dispersion) when in the form of mixed crystals. These are formed in particular at elevated temperature. If the second step of the process of this invention is carried out at higher temperatures, the mixtures are obtained direct in the mixed crystal form which is stable in dispersion and is described in No. EP-A-119 465. It is therefore especially advantageous to carry out the second step under pressure in the temperature range above 100° C., for example in the range from 100°–150° C., preferably from 110°–130° C. Acccordingly, the process of the present invention preferably relates to the preparation of mixtures of dyes of formulae (3) and (4) in mixed crystal form having the specification cited in No. EP-A-119 465 (reference is made to the X-ray diffraction patterns indicated therein).

To obtain the preferred mixed crystal form, it is also possible to carry out the process of the invention at low temperature, e.g. below 100° C., and to effect the conversion to the desired crystal form subsequently. To this end, the resultant mixture can be heated to e.g. temperatures above 100° C., for example from 105°–150° C., preferably from 110°–130° C. This can be done for example in a solvent or diluent (e.g. in one of those mentioned above), preferably in water. Alternatively, the desired crystal form can also be obtained by recrystallisation as described in No. EP-A-119 465.

The preferred mixture ratio of the dyes (3):(4) is in the range from 1:3 to 3:1, i.e. the mixture contains 0.33–3 parts of the dye of formula (4) per 1 part of the dye of formula (3). In particular, the mixtures obtainable by the process of the invention contain 0.5–2 parts, preferably 0.6–1.5 parts, of the dye of formula (4) per 1 part of the dye of formula (3).

The excess amine can be recycled in both steps. In the first step, the amine can be re-used direct after isolating the intermediate, after optional replenishment with fresh amine. In the second step, either the solvent/amine mixture can be re-used for a further batch or the solvent (e.g. water) can be removed by distillation and the pure amine re-used.

The dyes or dye mixtures obtained according to this invention can be used for dyeing hydrophobic fibres such as synthetic linear polyesters, e.g. polyethylene glycol terephthalate, or polymers which are chemical analogs thereof, as well as semi-synthetic fibres such as cellulose triacetate. Detailed particulars regarding the use of the dye mixtures containing the dyes of formulae (3) and (4) will be found in No. EP-A-119 465. The mixed crystal form described therein which is stable in dispersion and can be obtained with particular advantage by the process of this invention is especially suitable for dyeing polyester textiles by high-temperature dyeing methods, e.g. in the range from 100°–140° C.

The process of this invention has a number of advantages over hitherto known process variants. Thus it affords a product which is exceedingly pure analytically as well as tinctorially in excellent yield. The mixture obtained is extremely stable, especially in dispersion. Scarcely any waste results from the process, as the starting materials (amines) can be almost completely recycled.

The following Examples illustrate the process of the invention in more detail. Throughout, parts and percentages are by weight, unless otherwise indicated.

EXAMPLE 1

(a) 225.2 g of 3-methoxypropylamine are charged to a 750 ml sulfonating flask and heated to 40° C. With stirring, 141.2 g of 1,4-diaminoanthraquinone-2,3-dicarboximide are added over 3 hours. The ensuing reaction is slightly exothermic, with evolution of $NH_3$. The viscous suspension is stirred for another hour at 40°–45° C., then cooled to 20° C. and further stirred for one hour. The precipitated product is filtered with suction and washed with 300 ml of methanol and then with 300 ml of water, affording 226.6 g of N-(3-methoxypropyl)-1,4-diaminoanthraquinone-2,3-dicarboximide [dye of formula (3)]. After optional replenishment with fresh 3-methoxypropylamine, the mother liquor can be re-used for a new batch.

(b) A laboratory autoclave is charged with 300 ml of water, 70.5 g of 3-(2-methoxyethoxy)propylamine and 169.2 g of the compound of formula (3) obtained in (a). The open autoclave is heated to 90° C., then closed, and the suspension is heated to 120° C. with stirring, whereupon the pressures rises to 1.2–1.3 bar. Stirring is continued for 2 hours at this temperature, then the batch is cooled to 20° C. and stirred for another hour at this temperature. The precipitated product is isolated by filtration and washed with 300 ml of methanol and then with 1000 ml of water. This product consists of 139.5 g of a mixture of the compounds of formulae (3) and (4) containing 60.9% of N-(3-methoxypropyl)-1,4-diaminoanthraquione-2,3-dicarboximide and 36.4% of N-[3-(2-methoxyethoxy(propyl]-1,4-diaminoanthraquinone-2,3-dicarboximide.

EXAMPLE 2

(a) 477.2 g of 3-(2-methoxyethoxy)propylamine are charged to a 750 ml sulfonating flask equipped with paddle stirrer and heated to 40° C. With stirring, 141.2 g of 1,4-diaminoanthraquinone-2,3-dicarboximide are added over 1¼ hours. The ensuing reaction is slightly exothermic, with evolution of $NH_3$. The reaction mixture is heated to 40° C. and further stirred at this temperature for 2 hours. The suspension is then cooled to 20° C. and stirred for a further hour at this temperature and filtered with suction. The filter cake is washed with 300 ml of methanol and then with 300 ml of water, affording 246.3 g of N-[3-(2-methoxyethoxy)propyl]-1,4-diaminoanthraquinone-2,3-dicarboximide with a solids content of 74.7%, corresponding to 180.1 g of this compound (100%). After optional replenishment with fresh 3-(2-methoxyethoxy)propylamine, the mother liquor can be re-used repeatedly.

(b) A laboratory autoclave is charged with 110 ml of water, 46.7 g of 3-methoxypropylamine and 148.1 g of the compound of formula (4) obtained in (a). The open autoclave is heated to 90° C., then closed, and the suspension is heated to 120° C. with stirring, whereupon the pressure rises to 1.2–1.3 bar. Stirring is continued for 2 hours at this temperature, then the batch is cooled to 20° C. and stirred for another hour at this temperature. The precipitated product is isolated by filtration and washed with 300 ml of methanol and then with 1000 ml of water. This product consists of 136.1 g of a mixture of the compounds of formulae (3) and (4) containing 56.7% of N-(3-methoxypropyl)-1,4-diaminoanthraquinone-2,3-dicarboximide and 42.2% of N-[3-(2-methoxyethoxy)propyl]-1,4-diaminoanthraquinone-2,3-dicarboximide.

EXAMPLE 3

310 ml of n-butanol, 27.9 g of 3-(2-methoxyethoxy)propylamine and 132.7 g of N-(3-methoxypropyl)-1,4-diaminoanthraquinone-2,3-dicarboximide obtained in Example 1(a) are charged to a 750 ml sulfonating flask equipped with paddle stirrer. The mixture is heated to reflux temperature over one hour and stirred for 20 hours. Stirring is continued for one hour after cooling to 20° C., and then the reaction mixture is filtered with suction. The filter cake is washed with 500 ml of n-butanol and then with 2000 ml of water, affording 138.2 g of a mixture of the compounds of formulae (3) and (4) containing 75.9% of N-(3-methoxypropyl)-1,4-diaminoanthraquinone-2,3-dicarboximide and 21.9% of N-[3-(2-methoxyethoxy)propyl]-1,4-diaminoanthraquinone-2,3-dicarboximide.

EXAMPLE 4

135 ml of water, 93.1 g of 3-(2-methoxyethoxy)propylamine and 132.7 g of N-(3-methoxypropyl)-1,4-diaminoanthraquinone-2,3-dicarboximide obtained in Example 1(a) are charged to a 750 ml sulfonating flask equipped with paddle stirrer. The mixture is heated to reflux temperature over one hour and stirred for 4 hours. Stirring is continued for one hour after cooling to 20° C., and then the reaction mixture is filtered with suction. The filter cake is washed with 300 ml of methanol and then with 1000 ml of water, affording 138.6 g of a mixture of the compounds of formulae (3) and (4) containing 59.5% of N-(3-methoxypropyl)-1,4-diaminoanthraquinone-2,3-dicarboximide and 38.1% of N-[3-(2-methoxyethoxy)propyl]-1,4-diaminoanthraquinone-2,3-dicarboximide.

In the second step an amine of formula R'—NH₂, to give mixtures consisting of dyes of the formulae

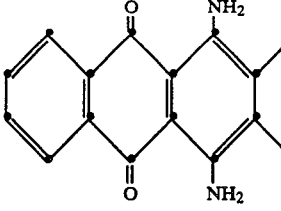

| Ex. | X | R | R' | Shade on polyester |
|---|---|---|---|---|
| 9 | O | —(CH₂)₃—O—CH₃ | —(CH₂)₃—O—CH(CH₃)₂ | blue |
| 10 | O | —(CH₂)₃—O—CH₃ | mixture of —(CH₂)₃—O—C₂H₅ and —(CH₂)₃—O—CH(CH₃)₂ | blue |
| 11 | NH | —(CH₂)₃—O—C₂H₅ | —(CH₂)₃—O—C₄H₉ | blue |

In Examples 3 and 4 it is also possible to react 1,4-diaminoanthraquinone-2,3-dicarboximide first with 3-(2-methoxyethoxy)propylamine and to effect partial transamidation of the resultant compound of formula (4) with 3-methoxypropylamine to give the desired mixture.

EXAMPLES 5–8

Further dyes of the general formula

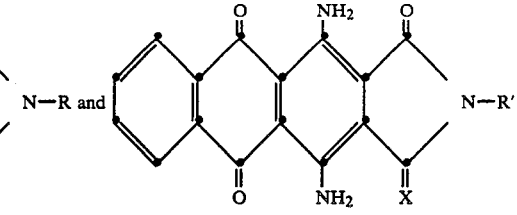

which can be prepared in accordance with Example 1(a) are listed in the following table.

| Ex. | X | R | Shade on polyester |
|---|---|---|---|
| 5 | O | —nC₄H₉ | blue |
| 6 | O | —nC₈H₁₇ | blue |
| 7 | NH | —C₂H₄—O—C₄H₉ | blue |
| 8 | O | —C₃H₆—O—C₂H₄—O—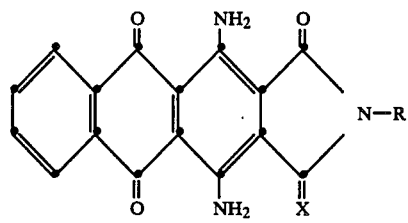 | blue |

EXAMPLES 9–11

The procedure of Example 1(a) and (b) is repeated, using in the first step an amine of formula R—NH₂ and

What is claimed is:

1. A process for the preparation of a mixture containing at least two dyes of the formula

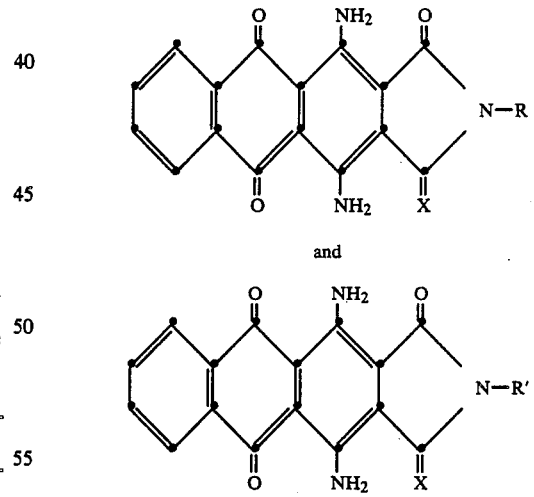

wherein
X is O or NH,
R and R' are different from each other and are alkyl, alkylene-O-alkyl, alkylene-O-alkylene-O-alkyl or alkylene-O-alkylene-O-phenyl in which alkyl contains 1 to 10 carbon atoms and alkylene contains 2 to 4 carbon atoms,
which process comprises
(a) preparing a mixture consisting of the two components
(i) a carboximide of the formula

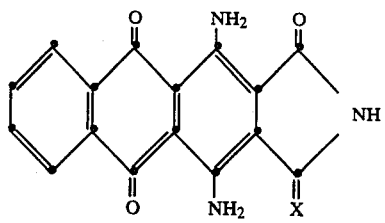

and (ii) an amine of the formula R—NH$_2$;

(b) reacting the two components until conversion to the dye is substantially complete;

(c) optionally isolating the product of step (b); and (d) reacting the product of step (b) or optional step (c) with R'—NH$_2$ in a molar ratio of components and under conditions of time, temperature, pressure and solvent to obtain a mixture in the mixed crystal form.

2. A process according to claim 1 wherein step (d) is conducted with an aliphatic or aromatic hydrocarbon, aliphatic or aromatic halogenated hydrocarbon, water, monohydric alcohol, polyhydric alcohol, or a mixture of any of these, as solvent.

3. A process according to claim 2 wherein said solvent is a monohydric alcohol or water.

4. A process according to claim 3 wherein said solvent is water.

5. A process according to claim 1 wherein step (d) is conducted at an elevated temperature of from 50° C. to 150° C.

6. A process according to claim 5 wherein the temperature is 70° C. to 140° C.

7. A process according to claim 1 wherein the molar ratio of R—NH$_2$:carboximide is from 3:1 to 20:1 in step (a), and R'NH$_2$ is used in step (d) in a 2-fold to 10-fold molar excess.

8. A process according to claim 7 wherein the molar ratio, in step (a) is from 4:1 to 10:1, and the molar excess of R'NH$_2$ in step (d) is 3-fold to 5-fold.

9. A process according to claim 1 wherein R—NH$_2$ is 3-methoxypropylamine and R'—NH$_2$ is 3-(2-methoxyethoxy)propylamine and the resulting dye mixture comprises one part of the dye in which R is 3-methoxypropyl and 0.1 to 5 parts of the dye in which R' is 3-(2-methoxyethoxy)propyl.

10. A process according to claim 9 wherein the temperature of step (d) is from 100° C. to 150° C.

11. A process according to claim 9 wherein the temperature of step (d) is lower than 100° C., upon completion of which step the product mixture is heated to a temperature of 105° C. to 150° C. to effect substantially complete conversion of the product mixture to the mixed crystal form.

* * * * *